INVENTOR
TADASHI TAKAHASHI
BY McGlew and Toren
ATTORNEYS

Feb. 27, 1968   TADASHI TAKAHASHI   3,370,660
WEIGHING APPARATUS COUPLED WITH PRICE COMPUTER
Filed Feb. 9, 1965   5 Sheets-Sheet 2
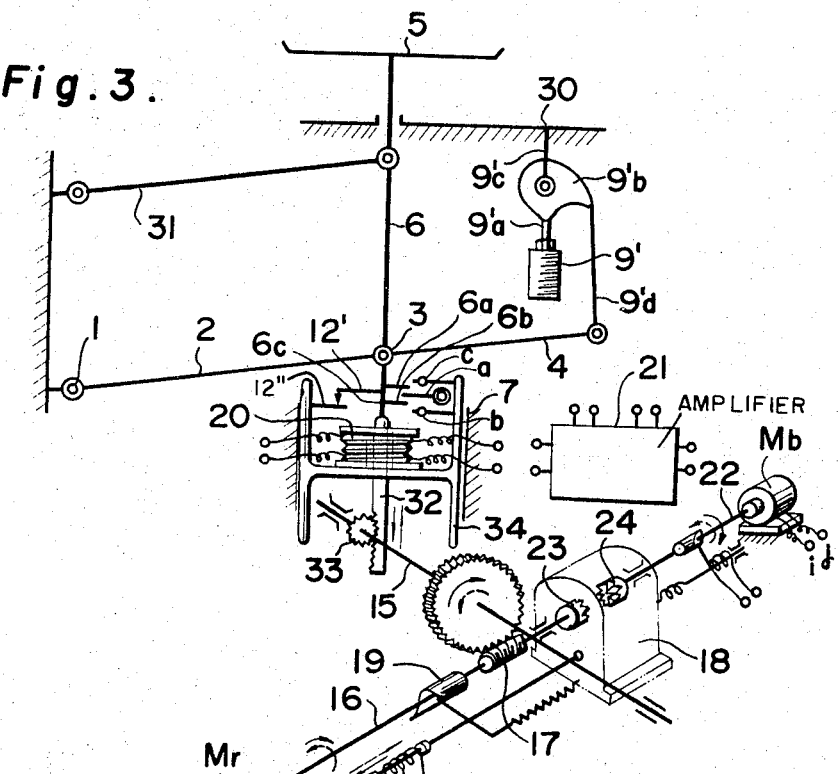
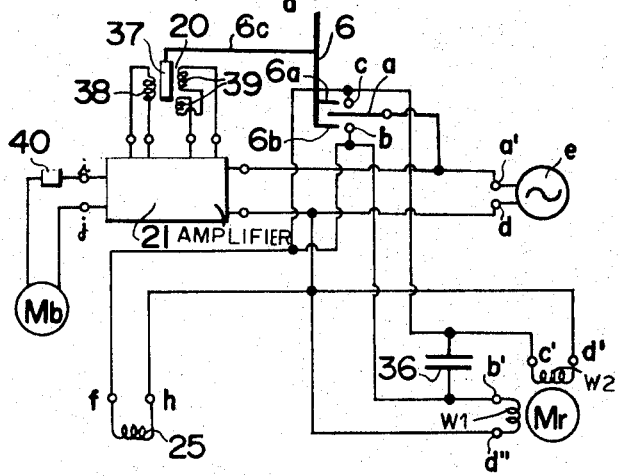
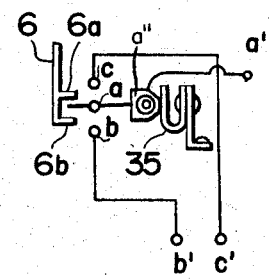
INVENTOR
Tadashi TAKAHASHI
BY McGlew and Toren
ATTORNEYS

INVENTOR

Tadashi TAKAHASHI

BY McGlew and Toren

ATTORNEYS

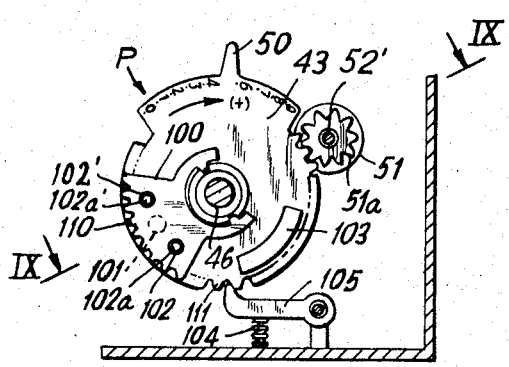
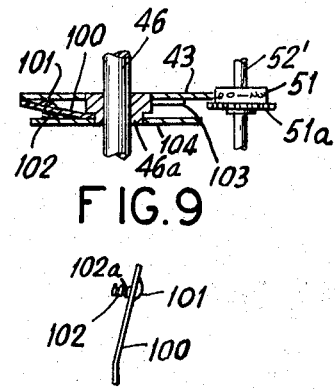
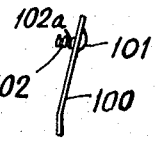
FIG. 8    FIG. 9    FIG. 10
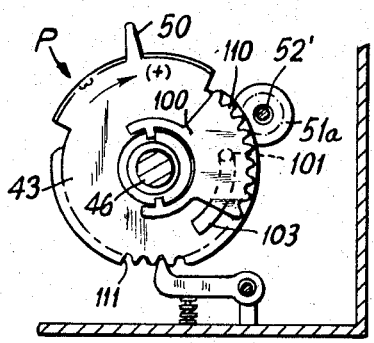
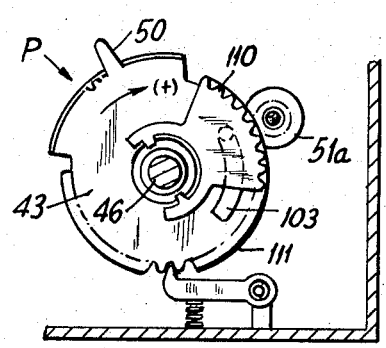
FIG. 11    FIG. 12
INVENTOR.
TADASHI TAKAHASHI
BY
McGlew & Toren
ATTORNEYS

United States Patent Office 3,370,660
Patented Feb. 27, 1968

3,370,660
WEIGHING APPARATUS COUPLED WITH PRICE COMPUTER
Tadashi Takahashi, 169 Yokoya, Uosaki-cho, Higashinada-ku, Kobe, Japan
Filed Feb. 9, 1965, Ser. No. 431,306
Claims priority, application Japan, Feb. 24, 1964, 39/9,823
2 Claims. (Cl. 177—25)

ABSTRACT OF THE DISCLOSURE

An article weighing and price computing apparatus is disclosed including a balance system having a platter to receive the article or object to be weighed. Stop means are engageable with the platter to limit movement thereof responsive to placing of an object thereon, and to absorb the shock due to such placing of an object thereon. Driving means are operable to displace the balancing system in opposition to the weight of the object to establish a balanced position following placing of the object on the platter and engagement of the platter with the stop means.

The disclosed driving means includes a rotatable driving shaft, a rotatable compensating shaft, a first motor driving the driving shaft and a second motor driving the compensating shaft. The first motor, responsive to engagement of the platter with the stop means, rotates the driving shaft through a number of equal angular displacements each corresponding to a first unit weight, and the number of displacements being the integral nearest the weight of the object. The second motor is operable to rotates the compensating shaft through a number of smaller equal angular displacements each corresponding to a unit weight which is an integral fraction of the just-mentioned unit weight. The number of angular displacements of the compensating shaft is equal to the difference between the weight of the object and the number of unit weights corresponding to the number of angular displacements of the driving shaft. The displacement effected by the compensating shaft corresponds to less than 1 of the minimum unit weights, and the second motor is conditioned to rotate the compensating shaft responsive to completion of rotation of the driving shaft by the first motor.

The computing mechanism is provided with selective clutch means by means of which it may be driven either by the driving shaft or by the compensating shaft.

Background of the invention

This invention relates to a weighing apparatus particularly to a weighing apparatus coupled with an automatic digital price computer for determining and displaying the weight ($w$) of a commodity together with the total price ($v$) of said commodity determined by multiplying a unit cost ($a$) per unit weight of said commodity by said weight ($w$) of the same in digital form.

The unit cost of each commodity varies considerably depending on the nature of the commodity, market conditions, and other economic and social situations, and hence it is important to select a proper unit cost which provides the maximum service at the minimum profit in order to establish a good reputation among customers. Therefore, it is preferable to provide such unit cost register to an automatic price computer that allows a high degree of freedom in selecting a proper unit cost.

In a preferred form of the invention, a register commonly used in a mechanical calculating machine is adapted to set a unit cost on the price computer, which allows selection of a proper price from a considerably wide range of possible settings, and then the unit cost thus selected is multiplied by the weight of the commodity determined by the weighing apparatus.

In a balancing system of conventional weighing apparatus, upon placing an article to be weighed on a scale plate thereof, there have been often produced some inevitable oscillations before such system is brought into a balanced position, which may cause not only a delay in the weighing process but a substantial error in the measured weight.

The balancing systems in conventional weighing devices have been heretofore actuated by a torque proportional to the difference between a torque due to the gravitational force acting on the commodity to be weighed and another torque due to a variable counterbalance force provided in said system, and the magnitude of such differential torque has not been large enough to actuate a price computer associated with said weighing device. Moreover, said magnitude of the differential torque diminishes as said balancing system approaches its balanced position making it more difficult for the price computer to calculate the price of the commodity accurately.

On the other hand, in the weighing apparatus of the invention, an external force issued to actuate the balancing system and to attain the balanced position thereof, and hence the torque necessary for driving a price computer associated with the weighing apparatus is supplied from said external force. This eliminates interference with the price computer by the weighing operation, and thereby it is possible to carry out accurate weighing and precise calculation at the same time.

The principal object of the invention is to provide a weighing apparatus coupled with an automatic digital price computer having a unit cost register of simple construction to allow selection of a unit cost from a wide range of available settings. Thereby it is possible to weigh a commodity quickly and accurately while determining and displaying the price of said commodity at the same time.

For a better understanding of the invention, reference is taken to the accompanying drawings, in which:

FIGS. 1 to 3 are diagrammatic views illustrating different embodiments of the invention;

FIGS. 4–(A) and 4–(B) are wiring diagrams for use with the devices of FIGS. 1 to 3;

FIG. 8 is a sectional view taken on the line VIII—VIII of FIG. 5;

FIG. 9 is a sectional view taken on the line IX—IX of FIG. 8;

FIG. 10 is an elevation view illustrating a detail of FIG. 9; and

FIGS. 11 and 12 are views, similar to FIG. 8, but showing the parts in different positions.

Figure 1:
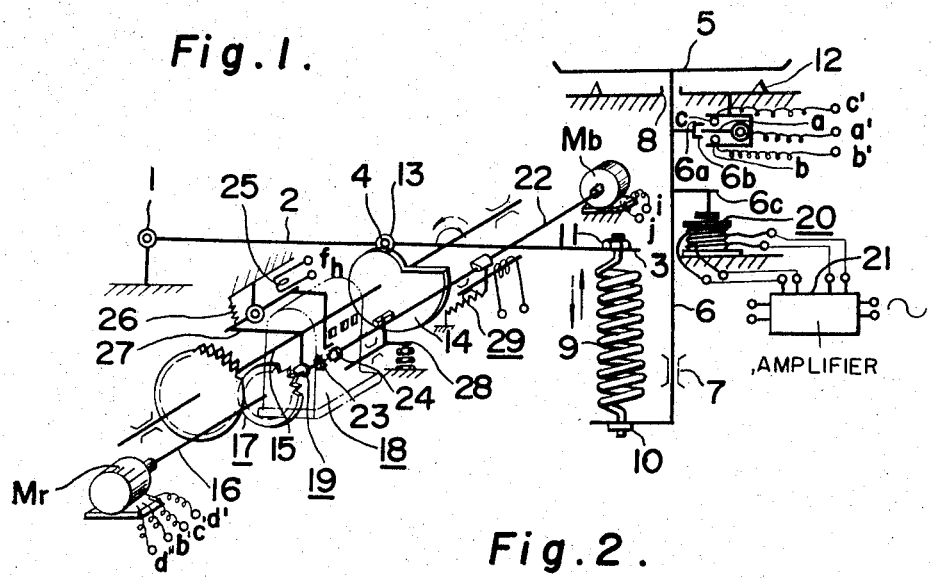

In the weighing apparatus of FIG. 1, a balance beam 2 is rotatably supported at a fixed fulcrum 1 located at the extreme left hand end thereof, as viewed from the front of the figure, and the opposite end 3 of the balance beam is connected to the upper end of a counter-balance spring 9 by a nut 11. The lower end of the spring 9 is, in turn, connected by a nut 10 to the lower end of an upright stud 6 which is held by a pair of vertical guides 7, 8 in a slidable manner. A scale plate 5 is secured to the upper end of the stud 6.

The scale plate 5 is so arranged as to be held stationary by fixed stop means 12 upon placing an article to be weighed on the scale plate in order to prevent oscillations of the plate in the vertical direction, which may cause errors in the weighed value.

A roller 13 is rotatably secured to the balance beam 2 at an intermediate point 4 thereof, and a cam 14 secured to a cam shaft 15 is urged against the roller 13 in order to elongate the counter-balance spring 9 in accordance with the rotation of the cam shaft 15. The cam shaft 15 is rotated by a reversible motor Mr through the drive shaft 16 and a transmission mechanism 17, during a first period of time from placing of an article to be weighed on the scale plate 5 till arrival of the balance beam 2 in its loaded balanced position corresponding to the weight of said article, and also during a second period of time from removal of said article out of the scale plate 5 till arrival of the balance beam 2 to its no-load balanced position. During the aforementioned first period of time, the circuit between contacts $a$ and $b$ of a limit switch, which is actuated by lugs 6a, 6b secured to the upright stud 6, is closed due to the fact that upright stud 6, having the scale plate 5 at the top end thereof, is held at its lowered position by stop means 12 supporting the gravitational force acting on the article. During said second period of time, the circuit between contacts $a$ and $c$ of said limit switch is held closed due to the fact that the stud 6 is biased to its raised position by counterbalance spring 9.

When the balance beam 2 is displaced, with an article to be weighed present on scale plate 5, responsive to the rotation of the cam 14 and brought to its loaded balanced position corresponding to the weight of the article being weighed, the counterbalance spring 9 is elongated, by the rotation of the cam 14, from the natural or no-load length to its "on-load" length so as to produce an elastic force acting on said article. Hence the magnitude of the angular displacement of the cam 14, and accordingly that of the cam shaft 15, represents elongation of the counterbalance spring 9, which, in turn, represents the weight of said article to be weighed. If such angular displacement is applied to a computing mechanism 18, then the weight of the article can be multiplied by the unit cost thereof, and the price of the article may be indicated in a suitable manner together with the weight of the article.

The process of the price calculation according to a form of the invention will now be described by taking a case wherein such calculation is carried out simultaneously with the measurement of the weight of the article, of which the price is to be determined. In the illustrated embodiment, the driving shaft 16 is so adapted as to make one full rotation, or an angular displacement of $2\pi$ radians, responsive to a unit weight $u$ equivalent to $n$ times a minimum grade weight S, $n$ being an integer. Besides, there is provided an adjusting device 19, which rotates the driving shaft to that position which corresponds to a weight of $(r \times u)$, r being an integer, or $r$ times a full rotation, wherein the weight of $(r \times u)$ is closest to the weight $w$ of the article to be weighed in excess thereof. For that rotation of the drive shaft 16 which corresponds to the difference between the weight $w$ of the article and the weight $(r \times u)$ where the shaft 16 stops, the cam shaft 15 is rotated without causing any elongation of the counterbalance spring 9. On the other hand, the upright stud 6 is raised upwardly by the distance corresponding to the rotation of the drive shaft 16 in excess of the weight $w$, and said distance is, in turn, detected by a differential transformer 20. The output from the differential transformer 20 is fed to a balancing motor Mb through an amplifier 21, and the angular displacement of the shaft of the motor Mb, or of a compensating shaft 22, is in turn fed to the computing mechanism 18 in order to make up for rotation of the drive shaft 16 in excess of the weight $w$.

The balancing motor Mb can be driven by, for instance, an output from a potentiometer (not shown) responsive to the output from the differential transformer 20, in order to rotate itself by an angle corresponding to the angular displacement of the drive shaft 16 in excess of the weight $w$.

In the above process, the reason for conducting the price calculation in two steps, namely approximation and fine correction thereof, is due to the fact that the accuracy and speed of the digital price calculation may be increased without any undue complications by assigning different decimal points to the drive shaft 16 and to the compensating shaft 22, and by engaging said shafts to a single unit price register of the computing mechanism in a selective manner, as will be described hereinafter in detail.

In short, the price of an article is at first calculated roughly for the approximate weight slightly in excess of the true weight thereof, which is determined by the rotation of the drive shaft 16 in conjunction with the the operation of the stepping device 19, and then the price for said excess weight is deducted from the roughly calculated approximate price as a fine correction thereof, by means of the rotation of the compensating shaft 22.

For instance, the weight corresponding to one full rotation of the compensating shaft 22 may be taken at $\frac{1}{10}$ of the aforementioned unit weight $u$, and if it is further assumed in this cast that the minimum grade weight S is $\frac{1}{10}$ of the unit of the weight represented by a full rotation of the drive shaft 16, then the one full rotation of the compensating shaft 22 corresponds to the minimum grade weight S. The ratio between the number of rotations of the drive shaft 16 for a certain weight and that of the compensating shaft 22 for the same weight can be taken at any suitable value, and the smaller said ratio, the more accurate the price calculation. For example, if the above ratio of rotation between the shaft 16 and the shaft 22 is taken at $\frac{1}{100}$, provided that $u=10 \times S$, then the price calculation can be carried out with an accuracy of $\frac{1}{10}$ of the minimum grade weight S.

Figure 5:
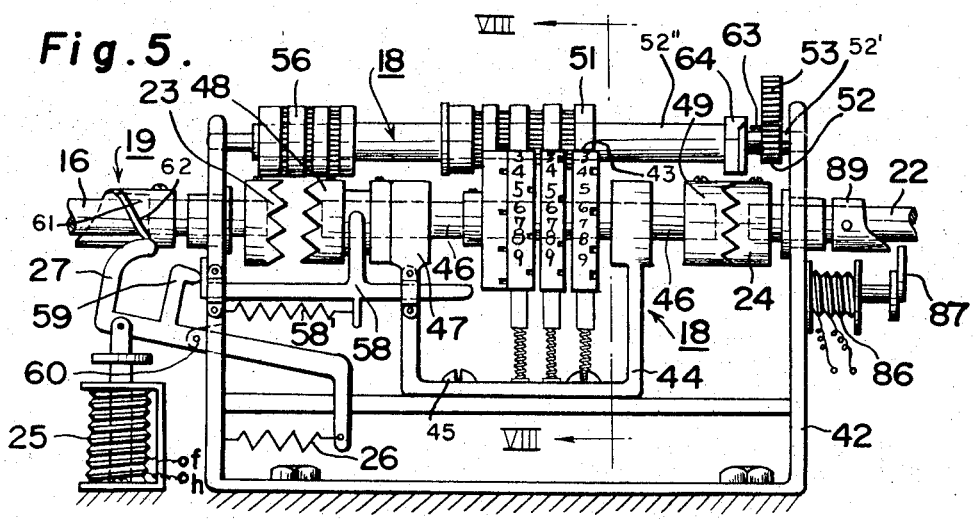
FIG. 5 is a diagrammatic front view and FIG. 6 is a perspective view of main parts of an embodiment of weighing apparatus in accordance with the invention, showing a specific arrangement of a computing mechanism.

If the weight W of an article to be weighed is given by $W = x \times u$, wherein $u$ is a unit weight and $x$ any arbitrary number, and furthermore, if an integer nearest to $x$ is designated by $r$ or $r'$, then said weight can be also expressed by $$W = r' \cdot u + (x - r') \cdot u \qquad (1)$$

$$W = r \cdot u - (r - x) \cdot u \qquad (2)$$

wherein, the Formula 1 is for an integer $r'$ smaller than $x$, and the Formula 2 is for an integer $r$ larger than $x$. The first terms on the right sides of the Formulae 1 and 2 indicate the result of rough computation, performed by rotation of the drive shaft 16, while the second terms thereof indicate fine corrections on the result of said rough calculation, conducted by the compensation shaft 22. The unit cost to be multiplied by the weight W is set on a unit cost register 43 as illustrated in FIG. 5.

The principles of the invention can be applied to the method of weighing as shown by the Formula 1 by modifying the operation of the adjusting device 19 and the direction of rotation of the compensating shaft 22. It is also permissible to make the device 19 adjustable so that either of the weighing processes according to Formulae 1 and 2 may be conducted in one weighing apparatus by suitably adjusting said device 19. In order to carry out the weighing process according to the Formula 1, it is necessary to provide a suitable spacing between the scale plate 5 and the stop means 12 when the balance beam 2 is brought to its "on-load" balanced position.

The price $v$ of the article is computed by multiplying each term of the above Equation 1 or 2 by a unit cost $a$ thereof. The multiplication of the term of $(r' \cdot u)$ or $(r \cdot u)$ is carried out to obtain a first approximation, and then a fine correction is made on such first approximation by actuating the compensating shaft 22. The position of the decimal point should be shifted prior to application of the above fine correction, depending on the relations between the rotation of shafts 16 and 22.

In order to facilitate the above shift of the position of the decimal point, there are provided a clutch member 23, at that end of the drive shaft 16 which faces a unit price register, and another clutch member 24 at that end of the compensating shaft 22 which faces said clutch member 23 on the drive shaft 16, and another clutch member is secured to a unit cost register so as to be engaged selectively with either of said clutch members 23 or 24. The unit cost register is connected to the drive shaft 16 until the device 19 completes its setting operation, while said connection of said unit cost register is shifted to the compensating shaft 22 upon completion of the setting operation of said device 19. During the above shift of connection of the unit cost register from the drive shaft 16 to the compensating shaft 22, the unit cost register is moved horizontally by a distance corresponding to the magnitude of the desired shift of the decimal point.

The details of the device 19 and the computing mechanism 18 will be described later. In FIG. 1, reference numeral 27 designates a setting arm which cooperates with the electromagnet 25, 28 a resetting lever which cooperates with the cam 14 for resetting the computing mechanism 18 to the zero position at the end of a return stroke thereof, and 29 a stepping device for the compensating shaft 22.

Figure 2:
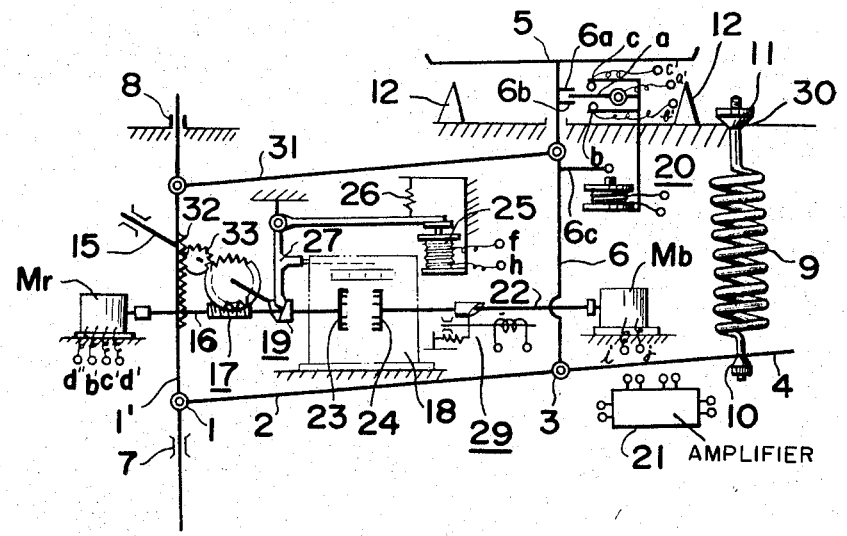

In FIG. 2, there is shown another weighing device embodying the invention, wherein an upright stud 1' is slidably supported by vertical guides 7, 8 so as to allow said stud to move freely in the vertical direction, and the fulcrum 1, at one end of a balance beam 2, is connected to stud 1' at the lower portion thereof. Secured to the opposite end 4 of the balance beam 2 is a counterbalance spring 9, which depends from a fixed point 30 of the weighing device. Another upright stud 6 having the scale plate 5 at the top end thereof is pivotally supported by the balance beam 2 at an intermediate point 3 thereof. In the figure, 31 designates a Roberval bar, 32 a rack and 33 a pinion cooperating with said rack, which replace the cam 14 and the roller 13 of the preceding embodiment, and other reference numerals similar to those in the preceding embodiment represent similar parts therein.

In the embodiment shown in FIG. 2, if an article to be weighed is placed on scale plate 5, the intermediate point 3 is held stationary by the stop means 12 through the upright stud 6, and the counterbalance spring 9 is elongated by the rotation of the reversible motor Mr energized due to closure of the circuit between contacts $a$ and $b$ of the limit switch, through the drive shaft 16, pinion 33, rack 32, and the upright stud 1'. When the elastic force of the counterbalance spring 9 is so increased as to balance the gravitational force acting on the article to be weighed, then the scale plate 5 is raised, together with the upright stud 6, to open the circuit between the contacts $a$ and $b$ of said limit switch to stop the motor Mr. Thereby the balance beam 2 is brought to and held at its "on-load" balanced position. By measuring the angular displacement of the drive shaft 16 from its no-load position to a position corresponding to the above "on-load" balanced position of the balance beam 2 by a suitable means, the weight and accordingly the price of said article can be determined in a manner similar to the preceding embodiment.

FIG. 3 illustrates another weighing device embodying the invention, in which the fulcrum 1 at one end of the balance beam 2 is pivoted to a fixed point and, instead of the counterbalance spring 9 of the preceding embodiments shown in FIGS. 1 and 2, a counterweight 9' is suspended from a cam 9'b, which depends from a fixed point 30 of the weighing device and is connected to the opposite end 4 of the balance beam 2. The counterweight 9' is held by an arm 9'a pivoted to cam 9'b which is, in turn, suspended from the fixed point 30 of the weighing device by a holding rod 9'c so that the cam 9'b may be rotated around the lower end of the holding rod 9'c. The upper end of the arm 9'a is connected to end 4 of the balance beam 2 through a flexible but inextensible cable 9'd extending along the cam surface of the cam 9'b. The configuration of the cam surface of the cam 9'b is so selected as to cause an upward lifting force acting on end 4 of the balance beam 2, and whose magnitude is proportionate to the angle of deflection of the cam 9'b around the lower end of the holding rod 9'c. The vertical displacement of end 4 of the balance beam 2 should also be in a suitable relation with said angular displacement of the cam 9'b, for instance the former is proportionate to the latter.

In this embodiment, the upright stud 6, which is pivotally connected to the balance beam 2 at an intermediate point 3 thereof, is provided with a support arm 12' in a manner such that support arm 12' may be engaged with a stop member 12" extending from a movable frame 34 upon placing an article to be weighed on the scale plate 5 secured to the upper end of the stud 6. Thereby the mechanical shock of placing the article on the scale plate, and subsequent oscillation of the stud 6 and balance beam 2, are completely eliminated. The frame 34 is moved vertically along the guide 7 by means of the reversible motor Mr, the drive shaft 16, a transmission mechanism 17, an intermediate shaft 15, a pinion 33 secured to the shaft 15, and a rack 32 secured to the lower end of the frame 34 so as to engage pinion 33. The rotation of the motor Mr is controlled by a limit switch in a manner similar to the preceding embodiments.

As the frame 34 is lowered by the motor Mr following the placement of the article on the scale plate 5, the upright stud 6 and the right hand end 4 of the balance beam 2 are also lowered to cause a gradual increase in the upward lifting force acting at end 4. When the effect of said lifting force acting at end 4 is balanced with the effect of the gravitational force acting on the article to be weighed, then the balance beam 2 is held stationary at its "on-load" balanced position. If the angular displacement of the drive shaft 16 from its no-load position to a position corresponding to the above "on-load" balanced position of the balance beam 2 is measured by a suitable means, then the weight and accordingly the price of said article can be determined in a manner similar to the preceding embodiments. The approximate calculation by means of a device 19 is corrected by using a differential transformer 20 mounted on the frame 34 in the same manner as in the preceding embodiments.

FIG. 4–A illustrates a preferred circuit arrangement suitable for controlling the weighing devices described hereinbefore referring to FIGS. 1 to 3, in which the contacts $a$, $b$, $c$, of a limit switch are operated by the lugs 6a, 6b provided on the upright stud 6, and the circuit including the contacts $a$ and $b$ is closed by the lug 6a when the commodity to be weighed is placed on the scale plate 5 due to the subsequent lowering of the stud 6 and is opened by removing the pressure of lug 6a when the "on-load" balanced position of the balance beam 2 is established. On the other hand, the circuit including the contacts $a$ and $c$ is closed by means of the lug 6b when the article to be weighed is removed to cause upward movement of the stud 6 by the counterbalance spring 9 or counterweight 9', and is opened when the balance beam 2 is brought back to its original no-load balance position. The construction of the limit switch including the contacts $a$, $b$, $c$, as shown in FIG. 4–B and which is provided with a snap mechanism, is suitable for price calculation according to the Formula 1, while the construction thereof as shown in FIG. 4–A is suitable for the price calculation according to the Formula 2. A block member $a''$ holding the snap contact $a$ is bevelled at the back thereof, as shown in FIG. 4–B and a snap spring 35 urges the block against a shaft holding the block so that the limit switch may be closed by one of the two lugs 6a and 6b and opened by the other of said two lugs.

In either case, the contact $a$ is connected to a terminal $a'$ of an electric power source $e$, while contacts $b$ and $c$ are connected to terminals $b'$ and $c'$ of windings $w_1$ and $w_2$, respectively, of the reversible motor $Mr$, and the other terminals $d'$, $d''$ of windings $w_1$ and $w_2$ are connected together to the other terminal $d$ of electric power source $e$.

The differential transformer 20 consists of a movable iron core 37 hung by the arm 6c of the upright stud 6, a primary winding 38 and a pair of secondary windings 39 connected in series but in opposite directions. These primary and secondary windings are connected to an amplifier 21, which is in turn connected to the balance motor $Mb$. There is provided a relay 40 capable of making the balance motor $Mb$ inoperative during the period of time when the circuit including the contacts $a$ and $b$ is closed, and of making said motor operative when said circuit is open.

One terminal $f$ of the electromagnet 25, which is for changing over the connection of the computing mechanism 18 from shaft 16 to shaft 22 after completion of the operation of the device 19, is connected in common to the contacts $b$ and $c$ of the limit switch cooperating with the stud 6, while the other terminal $h$ of the electromagnet 25 is connected to the terminal $d$ of the electric power source $e$.

Figure 6:
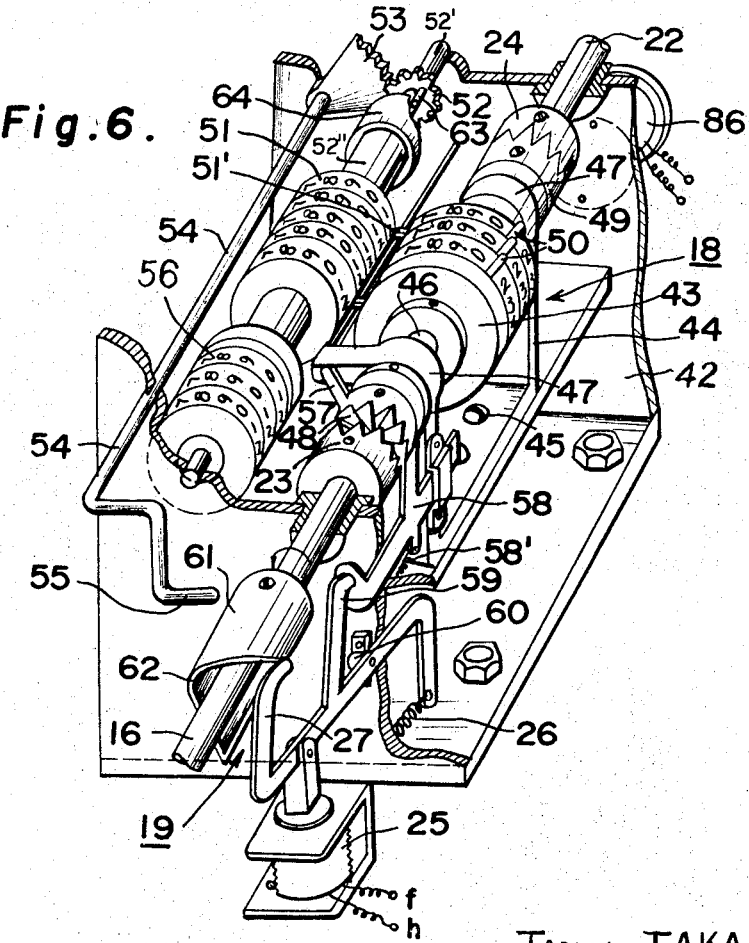

FIGS. 5 and 6 illustrate a preferred example of device 19 together with the computing mechanism 18 which is adapted to the unit weight $u$ of 10 g. represented by one full rotation of the drive shaft 16, and to the minimum grade weight $S$ of 1 g. represented by one full rotation of the compensating shaft 22.

The framework 42 of the computing mechanism 18 supports the end portions of the drive shaft 16 and the compensating shaft 22, respectively, as shown in the figures, and an inner frame 44 is secured to said framework 42 by means of rivets 45 in order to hold a series of drums of the unit cost register 43 in coaxial alignment with the coaxial shafts 16 and 22. The shaft 46 of register 43 is supported by bearings 47 in a horizontally slidable and axially rotatable manner. The shaft 46 is also provided with clutches 48, 49 at respective opposite ends thereof, which engages with clutches 23, 24, respectively.

The structure of the price computing mechanism 18 to be used together with the weighing apparatus according to the invention can be of any known type, and since such structure is apparent to those skilled in the art, only a brief description thereof will be given hereinafter by way of an example. It should be understood that the example is solely for illustration and the invention is not limited by such example.

In a preferred embodiment of the invention shown in FIGS. 5 and 6, there are provided a series of register drums 43, each having ten numerals 0 to 9 inscribed on the peripheral surface thereof, which are secured to a register shaft 46. Such register drums act to provide settings from which a unit price setting of the article being weighed is preselected, and each register drum represents a decimal place of the settings.

Referring to FIG. 8, each register drum 43 has a setting knob or finger 50 extending radially from the peripheral surface thereof. Each individual numeral of a certain decimal place of the unit price can be registered on the corresponding register drum 43 by turning setting knob 50 thereof so as to bring the selected inscribed numeral to a certain predetermined angular position, such as the position indicated by arrow P in FIG. 8. Thus, a certain unit price can be selected on the series of the register drums 43 by assigning each decimal place of the unit price to an individual register drum located at a position corresponding to the decimal place, and then by moving setting knobs 50 of the individual register drums, representing corresponding decimal places of the unit price, in such a manner that each numeral of the corresponding decimal place of the unit price is indicated at the preselected angular position P. In the case of FIG. 8, a numeral "0" is selected on the particular drum 43.

It should be noted here that the range of settings for the unit price can be made very wide with the computing mechanism shown in the figures. For instance, if it is desired to use five significant figures for the unit price, then one can select such unit price by providing five register drums each representing one of five decimal places for the five significant figures.

A series of product drums 51 are rotatably mounted on a product cylinder 52" so as to cooperate with the register drums 43. The product cylinder 52" is rotatably fitted to a product shaft 52', which is, in turn, rotatably supported by the frame 42. In order to carry out the multiplication of the unit price setting, selected on the register drums 43, by the weight of the article being weighed, the register shaft 46 is rotated by a drive shaft of the weighing apparatus, for instance by the shaft 16 shown in FIGS. 1 to 3, whose angular displacement represents the weight of the article being weighed. Furthermore, a digital transfer means is provided to transfer the unit price setting, selected on the register drums 43, onto the product drums 51 responsive to a predetermined unit angular displacement, say 360 degrees or one revolution, of the register shaft 46. In the particular example shown in FIGS. 5, 6, 8 and 9, the digital transfer means comprises register drum 43, a holding claw 105 biased by spring 104 to engage teeth 111 on the periphery of the drum 43, a sector gear 100 having nine teeth 110, a cam 103 secured on the surface of drum 43 and a product gear 51a fixedly secured to, or integral with, each product drum 51. Sector gear 100 is fixed to rotate with register shaft 46, while register drum 43 has a slip fit with shaft 46 so that it is angularly displaceable relatively to shaft 46. Accordingly, when register shaft 46 is rotated, for example, by means of drive shaft 16, sector gear 100 is rotated therewith but register drum 43 is held stationary at the angular position preselected by selecting knob 50, drum 43 being restrained against movement by claw 105.

As shown in FIG. 9, a side disk 104 is secured to register shaft 46 so as to rotate therewith, and sector gear 100 is biased by springs 102 seated on pins 102a on the sector gear and engaging side disk 104. Consequently, sector gear 100 is normally bent, as shown in FIG. 10. A boss 101 is formed on sector gear 100 on the surface thereof opposite to the surface carrying pins 102a. When boss 101 is engaged with cam 103 on register drum 43, sector gear 100 is deflected toward side disk 104, so that its teeth 110 are then aligned for engagement with the teeth of product gear 51a.

Referring again to FIG. 9, sector gear 100 is arranged to engage with product gear 51a secured to product drum 51 only when teeth 110 are displaced close to side disk 104 by engagement of cam 103 with boss 101. Stated another way, gear 51a is never rotated by sector gear 100 when the sector gear is deflected away from side disk 104, as when boss 101 is not engaged with cam 103.

Let it be assumed that register drum 43 is kept at the "0" angular position, as shown in FIG. 8. In this case, as register shaft 46 is rotated clockwise in the direction indicated by the (+) arrow in FIG. 8, boss 101 of sector gear 100 is engaged with cam 103 only after sector gear 100 passes completely through that angular position where it is engageable with product gear 51a. Thus, with the numeral "0" selected on register drum 43, only "0" is transferred to product drum 51 upon each rotation of register shaft 46. In other words, product drum 51 is not rotated.

Now, let it be assumed that register drum 43 is set to indicate "3," as illustrated in FIG. 11. With this setting of register drum 43, cam 103 has an angular position such that, as sector gear 100 is rotated in a clockwise direction, boss 101 engages cam 103 at an angular position of sector gear 100 such that the last three teeth 110 of sector gear 100 are engaged with the teeth of product gear 51a before sector gear 100 completes a full clockwise rotation. Thereby, for each rotation of register shaft 46, numeral "3" is transferred to product drum 51. It will be apparent that, when register shaft 46 is rotated through two revolutions, numeral "3" is transferred twice to product drum 51 so that numeral "6" is indicated on the product drum.

Now, let it be assumed that numeral "5" is selected on register drum 43, as shown in FIGURE 12. In such case, cam 103 is further displaced in a counterclockwise direction, as compared to the position in FIG. 11. Boss 101 on sector gear 100 engages cam 103 at an angular position of sector gear 100 such that five teeth 110 of sector gear 100 engage product gear 51a before sector gear 100 finishes a full clockwise rotation. Thereby, for each complete rotation of register shaft 46, numeral "5" is transferred to produce drum 51. If register shaft 46 is rotated through two complete revolutions, numeral "5" is transferred twice to the product drums 51, so that numeral "0" is indicated on that product drum which is located opposite to the register drum 43 having numeral "5" preselected thereon. Correspondingly, a numeral "1" is carried to an adjacent product drum 51 at the next higher decimal place of the product drums, by means of a known carrying or transfer device 51'. Thereby, upon completion of two rotations of register shaft 46, that number selected on the register drums, for example, "5," is multiplied by 2, and the product, for example, "10," is indicated on product drums 51.

Similarly, if a certain predetermined unit price is set on the series of register drums 43 and the register shaft 46 is rotated by an integral number of revolutions representing the weight of an article, or the product of the unit price multiplied by the weight of the article, is indicated on the series of product drums 51, provided that the decimal place of the computing mechanism is fixed at a certain position throughout the period when the register shaft is rotating.

As shown in FIG. 6, a re-set shaft 54 is provided to facilitate re-setting of the series of product drums 51 and weight indicating drums 56 to their respective zero positions, and the re-set shaft 54 is actuated by a crank 55. The operation of the weight indicating drums 56 will be described hereinafter. When the reversible motor Mr (FIG. 1) is rotated in a reverse direction to return the cam 14 (FIG. 1) to its initial position upon removal of the article being weighed from the scale plate 5, a re-set lever 28 (FIG. 1) is brought into operative engagement with the crank 55 toward the end of the return stroke of the cam 14. Thereby the re-set shaft 54 is rotated, together with a sector gear 53 secured thereto, and the sector gear 53 is in turn engaged with a pinion 52 secured to the product shaft 52' to rotate the pinion 52. Thus, an actuating rod 63 carried on the pinion 52 is brought into operative engagement with a re-set cam 64 secured to the product cylinder 52", and the indications of the product drums 51 and the weight indicating drums 56 are re-set to zero in a known manner. The register drums 43 can be re-set manually by moving the setting knobs 50 to their respective zero positions.

Further, a series of weight indicating drums 56 are coaxially mounted on the product cylinder 52 to indicate the weight of the article to be weighed. Each place of said weight indicating drum 56 is actuated by means of a pin 57, secured to the register drums 43, responsive to each rotation of the register drums 43, which is, in turn, actuated by the drive shaft 16 and the compensating shaft 22 as described hereinbefore.

With respect to the transferring mechanism between pin 57 and weight indicating drums 56, it will be apparent to those skilled in the art that a mechanism similar to, but much simpler than, the transferring mechanism just described with reference to FIGS. 5, 6 and 8 through 12 can be used. Accordingly, it is believed that detailed description of the transferring mechanism for the weight indicating drums 56 is not necessary.

A shifter 58 and a shifter re-set spring 58' are provided in order to change over the connection of the register drums 43 from the drive shaft 16 to the compensating shaft 22 and vice versa.

The position of the shifter 58 is controlled by an electromagnet 25 through an operating lever 59, which is pivotally supported by a shaft bearing 60. In the embodiment shown in FIGS. 5 and 6, the lever 59 is biased strongly by a spring 26 to the position as shown in FIG. 6, as long as the electromagnet 25 is de-energized. Shifter re-set spring 58' acts to apply a bias force to the shifter 58 so as to keep the clutch 48 in engagement with the cooperating clutch 23, unless the shifter 58 is urged rightward, as viewed in FIG. 6, by the operating lever 59.

The device 19 comprises a stepping lever 27, formed as an integral part of the operation lever 59, and a cylindrical setting cam 61 secured coaxially to the drive shaft 16 next to the intersection of the shaft 16 and the framework 42. The configuration of the cam surface 62 of the cam 61 to be engaged with the stepping lever 27 consists of a spiral portion extending around the drive shaft 16 through less than one turn around the axial center line thereof at a substantially large skew angle and a linear portion extending between both ends of said spiral portion substantially in a straight line, as illustrated in FIG. 6.

During the period of time when the balance beam 2 is moved from its lowered position, immediately after placing the article to be weighed on scale plate 5, to its on-load balanced position, the circuit including the contacts a and b of the limit switch is closed. In the case of the embodiment shown in FIGS. 5 and 6 the solenoid is then energized. Thereby the stepping lever 27 and the operation lever 59 are pulled downwardly by the electromagnet 25 against the biasing elastic force of the spring 26, and hence both levers 27 and 59 are kept away from the drive shaft 16 and the shifter 58. When the balance beam is brought to its on-load balanced position and the circuit between contacts a and b is opened, then, in the case of the embodiment shown in FIGS. 5 and 6, the solenoid of the electromagnet 25 is de-energized to actuate the stepping lever 27 so as to urge it against cam surface 62 with sufficiently large force due to the spring 26, to move the drive shaft 16 additionally, through rotation of the cam 61, to the end of a suitable unit angular displacement. Thereby an approximate calculation by the drive shaft is completed.

Stepping, setting, or adjusting device 19 is thus effective, whenever shaft 16 has been rotated through less than a whole number of revolutions by motor Mr, to displace shaft 16 angularly through that part of one revolution necessary to bring shaft 16 to an angular position representing the next higher whole number of revolutions. The angular displacement effected by device 19 is dependent upon that point of the sloping or helical surface of cam 62 initially engaged by lever 27 when electromagnet 25 is deenergized. At the same time with the above additional movement of the drive shaft 16, the shifter 58 is so actuated by the spring 26 as to shift the position of the register drum to a preselected proper location suitable for carrying out the price calculation responsive to the rotation of the compensating shaft 22. As mentioned in the foregoing, in the present embodiment, the drive shaft 16 serves to calculate the price by increments of 10 grams, and the compensating shaft 22 by increments of 1 gram.

In the resetting process, the calculating drum 51 and the weight indicating drum 56 are reset, responsive to rotation of the sector gear 53, through the pinion 52, the pin 63 of said pinion, and the cam 64.

According to the invention, it is permissible to make the ratio between the rotation of the drive shaft 16, for a certain given weight, and that of the compensating shaft 22, for the same weight, at 1:20 or at 1:30, in order to carry out the weighing and pricing of an article based on the system of numeration by 20 or by 30.

Figure 7:
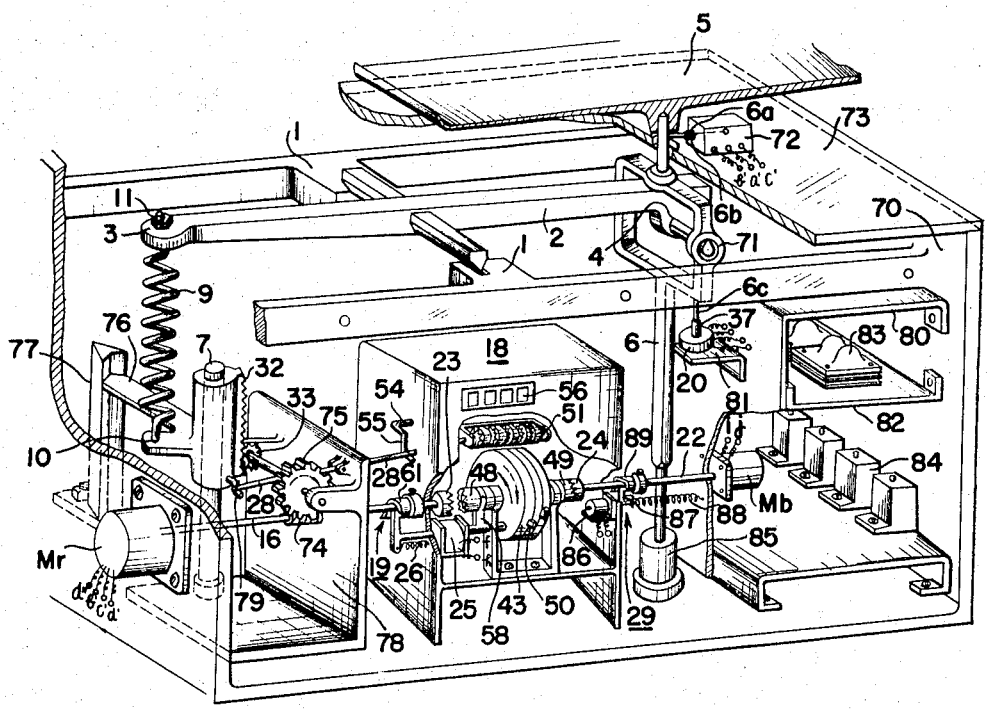
FIG. 7 is a perspective view showing the inside structure of a weighing apparatus including the computing mechanism of FIG. 6.

FIG. 7 illustrates a weighing device embodying the principles of the invention as described hereinbefore referring to FIGS. 1 to 6, wherein the balance beam 2 is supported by a fixed support member 1 formed as an integral part of the framework 70 of the device. The upright stud 6, having a scale plate 5 secured at the top end thereof, is pivotally supported on the knife edge 71 located at one end of the balance beam 2, and a limit switch 72 having contacts a, b, and c, controlled by lugs 6a and 6b extending horizontally from the upright stud 6, is secured to the top plate 73 of the framework. A counterbalance spring 9 is connected between the opposite end of balance beam 2 and a rack 32, which engages with a pinion 33 secured to a shaft coaxially with another pinion 75 engaged with a worm 74 secured directly on the drive shaft 16 of the reversible motor Mr. The vertical movement of the rack 32 along a vertical shaft 7 is guided by a vertical guide member 77, and an arm 76 extending from the rack 32 is slidably fitted in a guide groove on guide member 77 so as to prevent rotation of rack 32 around vertical shaft 7. The vertical shaft 7 and the guide member 77 are secured to the bottom plate of the framework 70, and both the shaft of pinions 33 and 75 and the drive shaft 16 are rotatably supported by the bearing bracket 78.

There is provided a boss 79 extending from the rack 32 so as to engage the resetting handle 28, pivotally supported on the bearing bracket 78, at the end portion of the return stroke of rack 32 upon removal of the article being weighed from scale plate 5, in order to reset the product drums 51 of the computing mechanism 18 and the weight drums 56 to their zero positions, respectively, through the resetting shaft 54. The computing mechanisms 18 and the stepping device 19 are operated generally in the manner as described in detail above, except that the computing mechanism and the weight indicating drums are disposed at upper and lower positions instead of on the same horizontal shaft, as shown in FIG. 7.

During the period of time when the drive shaft 16 is rotated additionally from the balanced position corresponding to the "on-load" balanced position of balance beam 2 to the end of a full rotation of said shaft by means of the stepping device 19, the balance beam 2 is rotated without causing any elongation of the counterbalance spring 9, while raising the scale plate 5. In order to make a proper fine correction for the above additional rotation of the drive shaft, a differential transformer 20 is secured to a bracket 81 extending from a side wall of a box 80 placed within the framework 70 so as to determine the magnitude of additional rotation of drive shaft 16 responsive to the relative position of a movable iron core 37 depending from the upright stud 6 with respect to said differential transformer 20, and to drive the balancing motor Mb responsive to the output from the transformer 20 to rotate the compensating shaft 22 by the amount proportional to the magnitude of said output. An amplifying transformer 83 is placed on the shelf 82 in the box 80 and amplifier electron tubes 84 are mounted on the bottom of the box. In the figure, the vertical guide 85 of the upright stud 6 also acts as a damper of the stud, and it is permissible to use damper 85 in order to absorb the oscillatory force upon placing an article to be weighed on the scale plate 5 and to support the plate 5 stationary against the gravitational force acting on the article.

In the present embodiment of the invention, another device 29 is provided on the compensating shaft 22, and is controlled by another electromagnet 86. The electromagnet 86 is kept energized when the compensating shaft 22 is rotated in order to avoid any interference with the rotation of shaft 22, while, upon arrival of the balancing motor Mr in its balanced position, the solenoid of the electromagnet 86 is deenergized. Thereby, the compensating shaft 22 is brought to a position corresponding to the end of a full rotation closest to the true weight of the article being weighed, by means of a spring 88 through the setting lever 87 and the setting cam 89. The cam surface of the setting cam 89 comprises two spiralled portions, each of which extends around the axial center line of the compensating shaft 22 through an angle of 180 degrees at the same spiral angle but in opposite directions, and a groove extending in the longitudinal direction of the shaft 22 at the intersection of said spiralled portions. Therefore, it is apparent that cam 89 acts to count any fractional rotation of the compensating shaft 22 in excess of one half of a full rotation of the shaft as equivalent to the full rotation and to disregard the rest of the fractional rotation thereof.

In the particular embodiment of the invention shown in FIG. 7, the register drums 43 of the computing mechanism 18 are so adapted as to make an integral number of revolutions. However, it is possible to make the register drums 43 to rotate in integral multiples of half a revolution, or integral multiples of an angle of 180 degrees. Furthermore, the register drums can be made to rotate in integral multiples of any fraction of a revolution, if so desired. In such cases, the configuration of the cams 61 and 89 should be modified to complete the rotation of the register drums 43 in an integral multiple of a certain predetermined fraction of a revolution.

It is apparent for those skilled in the art that the above operation of the stepping device 29 can be attained by arranging the electromagnet 86 in a manner similar to that of electromagnet 25, as shown in FIG. 5.

What I claim is:

1. A computing weighing scale comprising, in combination, a price computing mechanism; a balance system including a platter to receive an object to be weighed; stop means engageable with said platter to limit movement thereof responsive to the placing of an object thereon and to absorb the shock due to placing of an object on the platter; and driving means operable to displace the balancing system in opposition to the weight of the object on said platter to establish a balanced position following placing of the object on the platter; said driving means including a rotatable driving shaft, a rotatable compensating shaft, a first motor driving said driving shaft and a second motor driving said compensating shaft; said first motor, responsive to engagement of said platter with said stop means, operating said driving shaft through a number of equal angular displacements, each corresponding to a first unit weight, the number of angular displacements being an integral nearest the weight of the object; said second motor being operable to rotate said compensating shaft through a number of smaller equal angular displacements each corresponding to a unit weight which is an integral fraction of the first mentioned unit weight, the number of the angular displacements of said compensating shaft being equal to the difference between the weight of the object and the number of unit weights corresponding to the number of angular displacements of said driving shaft, the displacement effected by said compensating shaft corresponding to less than one of said minimum unit weights; said second motor being conditioned to operate said compensating shaft responsive to completion of the rotation of said driving shaft by said first motor; said price computing mechanism comprising a unit cost register having a series of register drums secured to a register shaft to be actuated by said driving means and adapted to provide settings from which a unit price setting is pre-selected; each register drum being provided with ten positions corresponding to numerals 0 to 9 indicated on the peripheral surface thereof at uniform intervals for representing a decimal place of the settings; a series of product drums rotatably mounted on a product shaft; each product drum being provided with ten positions corresponding to numerals 0 to 9 indicated on the peripheral surface thereof at uniform intervals; a digital transfer means operable to transfer the unit price setting on the register drum to the product drums by rotating the product drums around the product shaft responsive to each predetermined unit angular displacement of the register shaft; clutch means operable to connect said register shaft selectively to either said drive shaft or said compensating shaft; and a shifting means operable to shift the register shaft so that the apparent decimal point of said unit register can be shifted responsive to each change-over of said connection of the register shaft from said drive shaft to said compensating shaft, and vice versa; whereby the price of the article is indicated on the product drums as a product of the unit price setting, selected on the register drums, multiplied by the weight of the article, as represented by the angular displacement of the register shaft by the driving means.

2. A computing weighing scale, as claimed in claim 1, including stepping means operable to set the angular position of said driving shaft toward the end of each weighing operation thereof and always at an integral multiple of a certain predetermined unit angular displacement corresponding to a certain preselected unit weight; the angular position of the drive shaft thus set by said stepping means representing an approximate weight of the article being weighed expressed in an integral multiple of said unit weight; differential means operable to produce an output representing the difference between the true weight of the article and said approximate weight; said transmission means including clutch means selectively engageable with said clutch means on said driving shaft and said compensating shaft, and shifting means operable to shift the decimal point in the computing means responsive to each changeover of the connection of the multiplying means from the drive shaft to the compensation shaft and vice versa.

References Cited
UNITED STATES PATENTS

| | | | |
|---|---|---|---|
| 2,341,226 | 2/1944 | Marshall et al. | 177—26 |
| 2,948,523 | 8/1960 | Allen | 177—12 |
| 3,095,054 | 6/1963 | Allen | 177—25 X |
| 3,104,806 | 9/1963 | Allen | 177—25 X |

RICHARD B. WILKINSON, *Primary Examiner.*

G. H. MILLER, JR., *Assistant Examiner.*